US006618064B2

(12) United States Patent
Takahashi et al.

(10) Patent No.: US 6,618,064 B2
(45) Date of Patent: Sep. 9, 2003

(54) COLOR IMAGE FORMING METHOD AND APPARATUS FOR PRECISELY POSITIONING IMAGE OF FIRST AND SECOND COLORS

(75) Inventors: Masaki Takahashi, Kanagawa-ken (JP); Yasuhiro Yokota, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/984,467

(22) Filed: Oct. 30, 2001

(65) Prior Publication Data

US 2002/0051211 A1 May 2, 2002

(30) Foreign Application Priority Data

Oct. 31, 2000 (JP) ....................................... 2000-333922

(51) Int. Cl.[7] ......................... B41J 2/385; G01D 15/06; G03G 15/01; G03G 15/16

(52) U.S. Cl. ........................ 347/116; 399/399; 399/301; 399/302; 399/308

(58) Field of Search .......................... 347/116; 399/302, 399/301, 318, 308

(56) References Cited

U.S. PATENT DOCUMENTS

| | | | | |
|---|---|---|---|---|
| 4,916,547 A | | 4/1990 | Katsumata et al. | |
| 4,937,664 A | | 6/1990 | Chiku et al. | |
| 5,053,827 A | * | 10/1991 | Tompkins et al. | 399/302 |
| 5,534,984 A | * | 7/1996 | Inoue | 399/308 |
| 5,950,047 A | * | 9/1999 | Miyabe et al. | |
| 6,038,423 A | | 3/2000 | Tagawa et al. | |
| 6,097,919 A | * | 8/2000 | Takeuchi et al. | 399/302 |
| 6,097,921 A | * | 8/2000 | Kageyama | |

* cited by examiner

*Primary Examiner*—Susan S. Y. Lee
(74) *Attorney, Agent, or Firm*—Oblon, Spivak, McClelland, Maier & Neustadt, P.C.

(57) ABSTRACT

An image forming method for forming detection marks by the respective developing units so as to obtain rotation speed information of the image forming unit, detecting the relative position of the detection marks by the detector, and then adjusting the image forming timing of each color on the basis of the relative position information, and forming a real image on the surface of the image forming unit, only when the detection marks pass the transfer position (i.e., the contact position between the image forming unit and the intermediate transfer medium), the image forming unit is kept in non-contact with the intermediate transfer medium.

15 Claims, 10 Drawing Sheets

COLOR IMAGE FORMING METHOD AND APPARATUS FOR PRECISELY POSITIONING IMAGE OF FIRST AND SECOND COLORS

CROSS-REFERENCE TO RELATED APPLICATION

This application is based upon and claims the benefit of priority from the prior Japanese Patent Application No. 2000-33392, filed on Oct. 31, 2000, the entire contents of which are incorporated herein by reference.

BACKGROUND OF THE INVENTION (1) Field of the Invention

The present invention relates to a color image forming method and a color image forming apparatus and more particularly to a color image forming method and a color image forming apparatus for superimposing a plurality of images on an image forming unit and then transferring the color images onto a transfer medium in a batch.

(2) Description of the Related Art

In an image forming apparatus for forming a color image on an image transfer medium such as a recording form, there are various systems available. For example, one of them is a tandem system for arranging image forming units for forming a single-color toner image in correspondence to three colors of yellow, magenta, and cyan or four colors including black whenever necessary in the direction of recording-form transfer and sequentially superimposing a single-color image on a recording form so as to form a color image. The other one is a multiple-development system for installing an exposure means and developing units of three colors or four colors including black on one image forming unit and superimposing each single-color image on the image forming unit so as to form a color image.

Further, there are two multiple-development systems for superimposing and developing a plurality of images available as shown below. One of them is a system for installing one exposure means on an image forming unit, forming a latent image once every rotation of the image forming unit, developing one color, and superimposing each single-color image on the image forming unit by three rotations or four rotations including black so as to form a color image. The other one is a system for installing exposure means and developing units for three colors or four colors including black on an image forming unit, forming and developing a latent image of each color during one rotation, and superimposing each single-color image so as to form a color image.

In the aforementioned tandem system, the respective image forming units are generally arranged continuously in the direction of recording form transfer at an interval of a predetermined distance, so that a plurality of images cannot be printed at the same time and when an output image formed by a preceding image forming unit is transferred by the distance between the image forming units in the direction of recording form transfer from the preceding image forming unit, it is superimposed from above by the next image forming unit so as to form an image.

Therefore, depending on assembly precision and mounting position errors of each image forming unit, the respective single-color images may not be precisely formed and superimposed. Further, images may be shifted due to an uneven recording form transfer speed. Due to these causes, as one of the disadvantages of the tandem system, difficulty in keeping the image superimposition precision high may be cited.

In order to correct such a relative displacement of each single-color image, conventionally, for example, as described in Japanese Patent Application Laid-Open 8-278680, predetermined detection marks are formed on the recording form transfer belt so as to be shifted by a predetermined distance in the respective image forming units, and the variation of each detection mark from the predetermined distance is measured by a detector such as an optical fiber sensor or a line sensor, and the displacement is corrected by adjusting the image drawing timing of each image forming unit or controlling the recording form transfer speed.

On the other hand, in a multiple-development system having one exposure means, a latent image of the first color is formed on the image forming unit by the image exposure means and the latent image of the first color is developed by the development means installed on the downstream side thereof. When the image forming unit makes one rotation and reaches the position of the image exposure means again, a latent image of the second color is formed on the image forming unit and the latent image of the second color is developed in the same way. In the same way, images of three colors or four colors including black are developed every rotation. Thereafter, the color images are transferred onto the intermediate transfer medium or image transfer medium in a batch.

Since an image is formed on the image forming unit color by color ever rotation by one image exposure means like this, if a latent image is drawn on the same position on the image forming unit every rotation, no displacement of each color is generated. Therefore, to reduce the displacement of each color in this system, for example, as described in Japanese Patent Application Laid-Open 6-1002, a position detection mark is provided on an image forming unit and on the basis of a signal detecting the mark, each image is positioned by drawing each color every rotation. However, the image forming unit must make three rotations or four rotations including black so as to form one color image, so that the system is not suited to increase the color image forming speed.

On the other hand, in a multiple-development system having an image exposure means installed in each development means, a latent image is formed on the image forming unit by the image exposure means of the first color and developed by the development means of the first color installed just on the downstream side of the image exposure means. Thereafter, the image forming unit moves and after the time interval decided by the moving speed thereof and the interval between the first color and the second color, a latent image is formed by the image exposure means of the second color. In the same way, images of three colors or four colors including black are superimposed, thus a color image is formed and transferred onto the intermediate image medium or image transfer medium. In this system, a color image can be formed by one rotation, so that the image forming speed can be increased. Further, the image exposure means and development means can be arranged around the image forming unit, so that there is an advantage that the whole apparatus can be miniaturized.

However, in this system, in the same way as with the tandem system, a displacement of each color is caused by the assembly precision of each image exposure means, the mounting precision between the respective image exposure means, the thermal expansion, and errors with time and a deterioration of the image quality is caused. To reduce the displacement of each color in this system, conventionally, as described in Japanese Patent Application Laid-Open 8-240949, a method is used that a support member is provided around the image forming unit, thus the precision of relative position of each image exposure means is improved.

Further, the inventors proposed a method for developing a mark for detecting a superimposition displacement of images as disclosed in Japanese Patent Application Laid-Open 2000-137358 by a developer of a specific color, thereby improving the detection precision.

However, in the recent request for high speed and high resolution of a color image forming apparatus, a request for high precision for a displacement of each color is increased more and sufficient image superimposition precision cannot be obtained by the conventional proposed system aforementioned.

Furthermore, a detection mark formed on the image forming unit is unnecessary for an image output from the image forming apparatus and it is an image to be removed in the apparatus. Therefore, in Japanese Patent Application Laid-Open 2000-137358, the image transfer medium is separated from the image forming unit and the detection mark is not transferred onto the image transfer medium and removed by the image forming unit cleaner installed behind the transfer position in the rotational direction. The detection mark which becomes unnecessary after detection of the image superimposition displacement can be erased in this way.

The image transfer medium is pressed against the image forming unit at a high press contact load. To prevent an image from disorder due to a relative speed difference between the image forming unit and the image transfer medium at the transfer position, the image transfer medium is driven by the tangential force from the image forming unit. Therefore, the load applied to the image forming unit is mostly a frictional load caused by a loss of the bearing of the image transfer medium.

In a state that an output image is formed actually, the image forming unit is in contact with the image transfer medium, and images formed on the image forming unit are continuously transferred onto the image transfer medium and additionally transferred to a medium such as a recording form, and an image is output.

On the other hand, when an image is formed in a state that the image forming unit is separated from the image transfer medium beforehand not to transfer the detection mark, the image transfer medium is pressed against the image forming unit at a high load, thus the load is greatly reduced compared with that at the time of real image output.

As a result, the rotational speed of the image forming unit is different between a case of forming a detection mark and a case of forming a real image and a problem arises that the superimposition correction is a correction which is very unreliable and meaningless.

As mentioned above, conventionally, to obtain sufficient superimposition precision, a method for forming a mark for detecting a superimposition displacement and adjusting the image position from the variation of the detection mark is used. However, when the image forming unit and the image transfer medium are separated from each other beforehand so as to erase the detection mark which becomes an unnecessary image after ending of variation detection, the rotational speed of the image forming unit is different between a case of forming a detection mark and a case of forming a real image and a problem arises that the displacement correction between an image of the first color and an image of the second color does not function.

BRIEF SUMMARY OF THE INVENTION

The present invention was developed with the foregoing problems in view and is intended to provide a color image forming method for precisely positioning an image of the first color and an image of the second color and suppressing an image displacement.

In an embodiment of a color image forming apparatus of the present invention, the color image forming apparatus has an image forming unit that the surface thereof rotates, a first image forming device arranged around the image forming unit for forming a first detection mark and a first image, a second image forming device for forming a second detection mark and a second image over the first image on the surface of the image forming unit, a transfer mechanism for transferring the first image and second image onto the image forming unit, and a controller for controlling these units, and a detector for detecting the first detection mark formed by the first image forming device and the second detection mark formed by the second image forming device is installed, and the controller corrects a forming position of the first image by the first image forming device or a forming position of the second image by the second image forming device according to a relative position of the first and second detection marks detected by the detector, and the color image forming apparatus has transfer mechanism separation means for keeping the transfer mechanism separated from the image forming unit at least during passing of the first and second detection marks through the transfer mechanism.

The detector may be installed between the transfer mechanism and the second image forming device.

A color image forming method of an embodiment of the present invention is a color image forming method comprising a first image forming step of forming a first image on the surface of a rotating image forming unit by a first image forming device, a second image forming step of forming a second image on the surface of the rotating image forming unit on which the first image is formed by a second image forming device, and a step of transferring the first image and second image formed on the surface of the image forming unit to a transfer mechanism arranged in contact with the image forming unit in a batch, and the color image forming method further comprises a detection step of forming a first detection mark on the surface of the image forming unit by the first image forming device in a state that the transfer mechanism is in contact with the image forming unit, forming a second detection mark on the image forming unit on which the first detection mark is formed by the second image forming device, and detecting the relative position of the first detection mark and second detection mark by a detector arranged at the detection position and a separation step of keeping the transfer mechanism in non-contact with the image forming unit when the first detection mark and second detection mark pass the transfer position, and the first image forming step is performed in a state that the transfer mechanism is in contact with the image forming unit, and the second image forming step is performed by controlling the timing according to the detection result obtained at the detection step in a state that the transfer mechanism is in contact with the image forming unit.

A color image forming method of an embodiment of the present invention is a color image forming method comprising a first image forming step of forming a first image on the surface of a rotating image forming unit by a first image forming device, a second image forming step of forming a second image on the surface of the rotating image forming unit on which the first image is formed by a second image forming device, a first transfer step of transferring the first image and second image formed on the surface of the image forming unit to a first transfer medium arranged in contact with the image forming unit at a first transfer position in a batch, and a second transfer step of feeding a second transfer medium between the first transfer medium and a pressure body arranged in contact with the first transfer medium at a second contact position and transferring the first image and second image transferred onto the intermediate transfer medium in a batch onto the second transfer medium in a batch, and the color image forming method further comprises a detection step of forming a first detection mark on the surface of the image forming unit by the first image forming device in a state that the second transfer medium is in contact with the pressure body, forming a second detection mark on the image forming unit on which the first detection mark is formed by the second image forming device, transferring the first detection mark and second detection mark onto the first transfer medium in a batch, and detecting the relative position of the first detection mark and second detection mark on the first intermediate transfer medium by a detector arranged at the detection position, a separation step of keeping the second transfer medium in non-contact with the first transfer medium when the first detection mark and second detection mark pass the second transfer position, the first image forming step to be performed in a state that the second transfer medium is in contact with the first transfer medium, and the second image forming step to be performed by controlling the timing according to the detection result obtained at the detection step in a state that the second transfer medium is in contact with the first transfer medium.

A color image forming method of an embodiment of the present invention is a color image forming method comprising a first image forming step of charging the surface of a rotating photosensitive drum by a first charger, selectively exposing the charged surface of the photosensitive drum by a first exposure unit, thereby forming an electrostatic latent image of a first image on the surface of the image forming unit, developing the electrostatic latent image of the first image by a first developing unit for feeding a developer to the electrostatic latent image of the first image, and forming the first image, a second image forming step of charging the surface of the rotating photosensitive drum on which the first image is formed by a second charger, selectively exposing the charged surface of the image forming unit by a second exposure unit, thereby forming an electrostatic latent image of a second image on the surface of the image forming unit, developing the electrostatic latent image of the second image by a second developing unit for feeding a developer to the electrostatic latent image of the second image, and forming the second image, and a step of transferring the first image and second image formed on the surface of the photosensitive drum to an intermediate transfer roller arranged in contact with the photosensitive drum at the transfer position in a batch, and the color image forming method further comprises a first detection mark forming step of charging the surface of the photosensitive drum, selectively exposing the charged surface of the photosensitive drum by the first exposure unit in a state that the intermediate transfer roller is in contact with the photosensitive drum, thereby forming an electrostatic latent image of a first detection mark, developing the electrostatic latent image of the first detection mark by the first developing unit, and forming a visible image of the first detection mark, a second detection mark forming step of selectively exposing the surface of the photosensitive drum on which the first detection mark is formed by the second exposure unit after a predetermined time from forming the electrostatic latent image of the first detection mark, thereby forming an electrostatic latent image of a second detection mark, developing the electrostatic latent image of the second detection mark by the second developing unit, and forming a visible image of the second detection mark, a detection step of detecting a time difference between the first detection mark and the second detection mark passing a detection position by a detector arranged at the detection position, a separation step of keeping the intermediate transfer roller and the photosensitive drum in non-contact with each other when the first detection mark and second detection mark pass the transfer position, the first image forming step to be processed in a state that the intermediate transfer roller is in contact with the photosensitive drum after the detection step, and the first image forming step of calculating the time until the exposure area exposed by the first exposure unit is exposed by the second exposure unit from the predetermined time and detected time difference and being performed after the calculated time from start of the first image forming in a state that the intermediate transfer roller is in contact with the image forming unit.

DETAILED DESCRIPTION OF THE INVENTION

Firstly, the first embodiment of the present invention will be explained with reference to FIG. 1.

Figure 1:
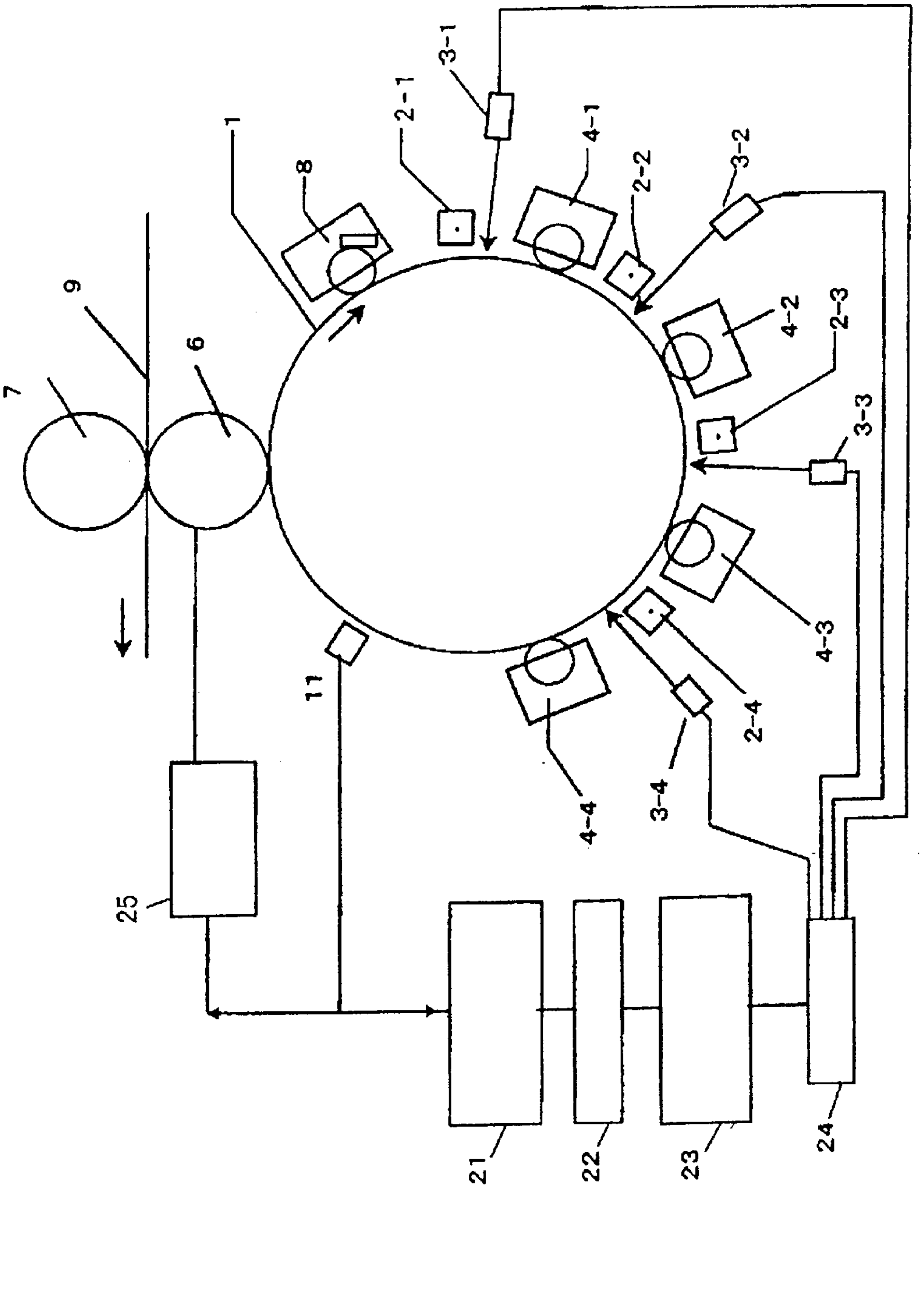
FIG. 1 is a schematic view of a color image forming apparatus relating to an embodiment of the present invention and FIG. 2 is a drawing for explaining a detection mark of an embodiment of the present invention.

FIG. 1 is a schematic view of a color image forming apparatus relating to the present invention and (1) Normal color image forming process, (2) Image displacement correction, and (3) Transfer unit will be explained sequentially hereunder.

(1) Normal Color Image Forming Process

An image forming unit 1 shown in FIG. 1 is a photosensitive drum having an organic series or amorphous silicon series photosensitive layer on a conductive base and rotates in the direction of the arrow almost at uniform speed.

The image forming unit 1 is uniformly charged by a well-known charger (a first charger) 2-1 such as a corona charger or a scorotron charger. Thereafter, the image forming unit 1 is exposed by an image-modulated laser beam oscillated from a first exposure unit 3-1 upon receipt of a signal from an exposure circuit 24 which is a control means and an electrostatic latent image of a first image is formed on the surface thereof. Thereafter, the electrostatic latent image of the first image moves to the developing position and the electrostatic latent image is visualized by a developing unit 4-1 storing a liquid developer (for example, a yellow liquid developer). Namely, the first image (image of the first color) is formed on the surface of the image forming unit 1 by the image forming apparatus composed of the first charger 2-1, the first exposure unit 3-1, and the first developing unit.

After the first image forming step is executed in this way, the image forming unit 1 rotates additionally and is subjected to the second image forming step indicated below.

The second image forming step uniformly charges the surface of the image forming unit 1 on which the first image is formed by a second charger 2-2 first. The charged image forming unit 1 is exposed by a second exposure unit 3-2 receiving a signal sent from the exposure circuit 24 which is a control means, thus an electrostatic latent image of a second image is formed on the surface of the image forming unit 1. Furthermore, the electrostatic latent image is visualized by a second developing unit 4-2 storing a liquid developer (for example, a magenta liquid developer), thus the second image (image of the second color) is formed on the surface of the image forming unit 1. Therefore, after the second image forming step, an image of two colors is formed on the image forming unit 1.

In the same way, a third image (for example, a cyan image) is formed on the surface of the image forming unit 1 by a third image forming apparatus composed of a third charger 2-3, a third exposure unit 3-3, and a third developing unit 4-3. In the same way, a fourth image (for example, a black image) is formed on the surface of the image forming unit 1 by a fourth image forming apparatus composed of a fourth charger 2-4, a fourth exposure unit 3-4, and a fourth developing unit 4-4.

In the above explanation, a liquid developer that toner particles are dispersed in an insulating and non-polarized carrier liquid is indicated as an example of a developer. However, the present invention is not limited to a liquid developer and dry toner particles using no carrier liquid may be used as a developer.

The full-color images composed of the first to fourth images laminated on the surface of the image forming unit 1 in this way are transferred to the transfer medium such as an intermediate transfer medium 6 by the transfer unit in a batch and additionally transferred to a final transfer medium 9 such as paper secondarily.

The intermediate transfer medium 6 uses, for example, an intermediate transfer roller that an elastic layer is formed on the surface of the roller base and is rotated in correspondence to rotation of the image forming unit 1 by a drive circuit 25. The intermediate transfer medium 6 is brought into contact with the image forming unit 1 (preferably press-fit and then heated), thus using the tackiness of toner particles forming the images, the images can be transferred to the intermediate transfer medium in a batch using the contact position as a transfer position. In this case, the transfer unit relating to the present invention is the intermediate transfer medium 6 arranged in contact with the image forming unit 1. Further, in the same way, the images transferred to the intermediate transfer medium 6 are transferred to the final transfer medium 9 such as paper fed between a pressure body 7 and the intermediate transfer medium 6 by the tackiness of toner particles.

Further, in the first embodiment of the present invention, a color image formed on the surface of the image forming unit 1 can be directly transferred to the final transfer medium without using the intermediate transfer medium. In this case, the pressure body 7 is structured so as to make contact (preferably press-fitting) with the image forming unit 1 and the final transfer medium 9 is fed between the pressure body 7 and the image forming unit 1. By doing this, a color image can be transferred directly to the final transfer medium 9 from the surface of the image forming unit 1. In this case, the press-fit part with the pressure body 7 is a transfer position and the pressure body 7 arranged in contact with the image forming unit 1 is a transfer unit.

(2) Image Displacement Correction

In the color image forming apparatus mentioned above, the image forming unit 1 is designed so as to always rotate at uniform speed and the second image forming step is executed late by the time difference from start of the first image forming step to movement of the image forming unit from the image forming position by the first image forming apparatus to the image forming position by the second image forming apparatus, so that the displacement between the first image and the second image can be prevented.

More concretely, assuming the time required for the area exposed by the first exposure unit 3-1 to move to the area exposed by the second exposure unit 3-2 as T seconds, the electrostatic latent image of the second image is started to be formed by the second exposure unit 3-2 T seconds later from start of forming of the electrostatic, latent image of the first image by the first exposure unit 3-1, thus the displacement between the first image and the second image can be prevented.

However, the rotational speed is changed slightly according to use of the color image forming apparatus for a long period of time and changes in the use environment such as temperature. As a result, a displacement is caused between the first image and the second image. Namely, the second image forming step is always executed T seconds later from start of the first image forming step by the first image forming apparatus. More strictly, even if the latent image of the second image is started to form T seconds later after start of forming of the latent image of the first image, when the rotational speed of the image forming unit is changed, a displacement is caused between the first image and the second image.

Therefore, it is necessary to adjust the image forming timing of each color, for example, before executing the first color image forming step after turning on the image forming apparatus or every forming of a predetermined number of color images and prevent image displacement.

An example of the image displacement correction method relating to the present invention will be explained hereunder.

The image displacement correction method forms four detection marks on the surface of the image forming unit 1 by the first to fourth image forming apparatuses. The detection step for detecting the relative position of the detection marks and information obtained by the detection step are fed back to the first to fourth image forming apparatuses and the image forming timing of the first to fourth image forming apparatuses is adjusted.

A detection mark for detecting the image superimposition displacement amount will be explained hereunder more in detail. In the superimposition correction system based on this embodiment, on the basis of superimposition data obtained by detection of the detection mark, the position of image data to be formed is shifted in units of dots, thus the single-color image position is corrected. By doing this, the relative position error between single-color images is reduced and color images free of superimposition displacement can be obtained.

Figure 2:
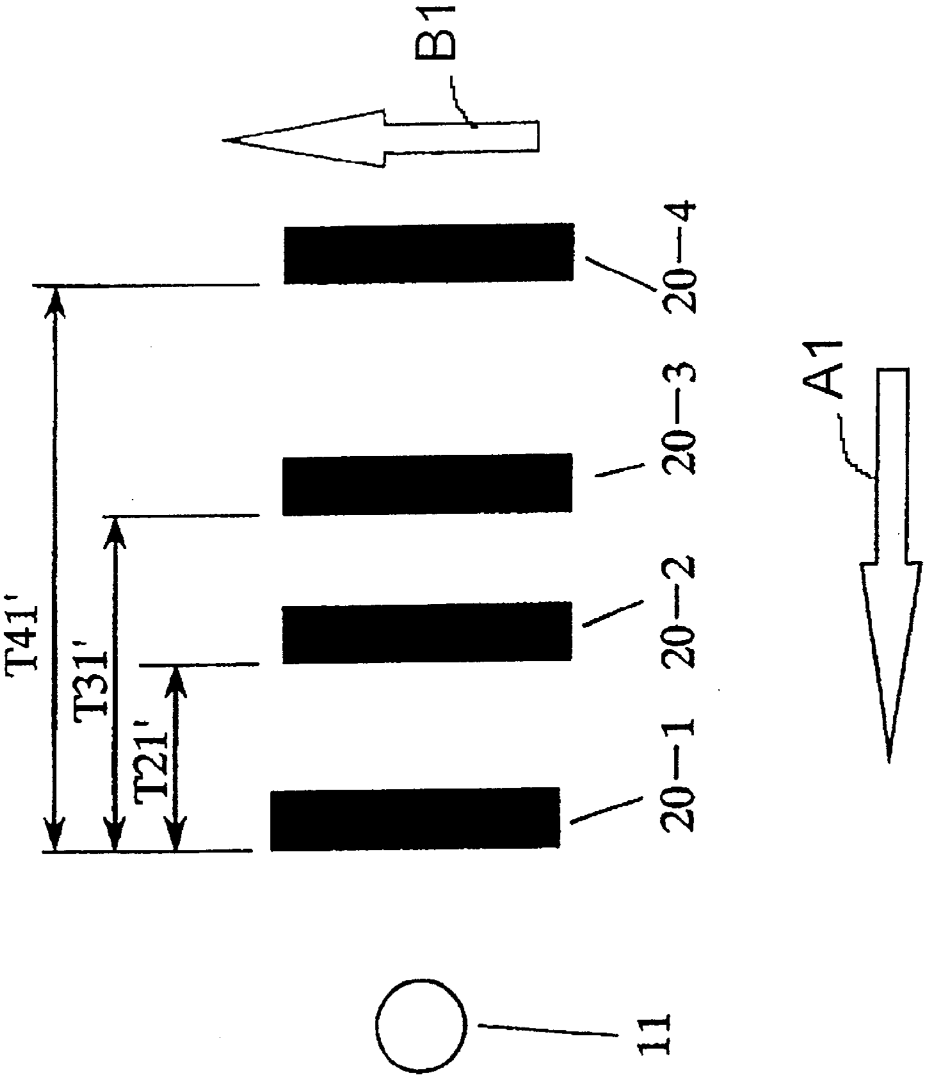

FIG. 2 is a drawing for explaining an example of a detection mark and a first detection mark 20-1, a second detection mark 20-2, a third detection mark 20-3, and a fourth detection mark 20-4 which are formed on the surface of the image forming unit 1 are shown.

The detection mark 20-1 is an image that a linear electrostatic latent image is formed in the direction B1 (hereinafter called a main scanning direction) perpendicular to the direction A1 (hereinafter called a sub-scanning direction) of rotation of the image forming unit 1 on the image forming unit 1 by the first exposure unit 3-1 upon receipt of a signal from the exposure circuit and then developed and visualized by the first developing unit 4-1.

After the predetermined time T+T21 from the moment of start of latent image formation by the first exposure unit 3-1 in accordance with a signal from the exposure circuit 24, a similar linear electrostatic latent image is formed by the exposure unit 3-2 and the second detection mark 20-2 is formed by the second developing unit 4-2. In the same way, after the predetermined time 2×T+T31, the third detection mark 20-3 is formed on the image forming unit 1 by the third exposure unit 3-3 and the third developing unit 4-3. In the same way, after the predetermined time 3×T+T41, the fourth detection mark 20-4 is formed on the image forming unit 1 by the fourth exposure unit 3-4 and the fourth developing unit 4-4.

These predetermined times T21, T31, and T41 are times corresponding to, for example, a distance of 1 mm on the image forming unit 1. Therefore, originally in this case, the detection marks 20-1, 20-2, 20-3, and 20-4 should be formed every 1 mm on the image forming unit 1. However, due to the aforementioned changes in the rotational speed of the image forming unit 1, the aforementioned predetermined times are changed as described hereunder.

The firth to fourth detection marks 20-1 to 20-4 are transferred in the rotational direction of the image forming unit 1 and the relative position thereof is detected between the fourth developing unit 4-4 and the intermediate transfer medium 6 by a detector 11.

In this case, it is assumed that the first detection mark 20-1, the second detection mark 202, the third detection mark 20-3, and the fourth detection mark 20-4 are formed on the image forming unit sequentially in the rotational direction of the image forming unit 1. When the mark detector 11 detects the detection marks 20-1, 20-2, 20-3, and 20-4, a mark detection signal is generated by a mark detection signal generation circuit 21. A counter circuit 22 inputs an output signal from a mark detection signal generation circuit 21 and detects the time interval of detection signals by the respective detection marks 20-1, 20-2, 20-3, and 20-4. The time interval is measured by the counter circuit 22 and the output is input to a timing correction circuit 23 for correcting the exposure start timing. In the exposure circuit 24, the exposure start timing is controlled by output of the timing correction circuit 23.

The time interval detected by the first detection mark 20-1 and the second detection mark 20-2 is assumed as T21', the time interval detected by the first detection mark 20-1 and the third detection mark 20-3 as T31', and the time interval detected by the first detection mark 20-1 and the fourth detection mark 20-4 as T41'.

In the exposure start timing correction circuit 23, the time differences when the image forming unit 1 moves from the exposure position of the first exposure unit 2-1 to the second to fourth exposure units 2-2 to 2-4 can be measured from the differences between the time intervals T21, T31, and T41 when the detection marks are formed by the laser exposure device 3 and the time intervals T21', T31', and T41' obtained by detection of the detection marks.

Concretely, the correction time T+(T21−T21') later after start of forming of the electrostatic latent image of the first image by the first exposure unit 2-1, forming of the electrostatic latent image of the second image by the second exposure unit is started. The correction time 2×T+(T31−T31') later after start of forming of the electrostatic latent image of the first image by the first exposure unit 2-1, forming of the electrostatic latent image of the third image by the third exposure unit is started. The correction time 3×T+(T41−T41') later after start of forming of the electrostatic latent image of the first image by the first exposure unit 2-1, forming of the electrostatic latent image of the fourth image by the fourth exposure unit is started. By doing this, displacements of the first to fourth images can be prevented.

The detector 11 relating to the aforementioned embodiment of the present invention is not particularly limited if it can detect detection marks formed on the surface of the image forming unit 1 and for example, an optical fiber sensor can detect the existence of a detection mark by irradiating light onto the image forming unit 1, receiving the light quantity of its reflected light by a photoelectric conversion element, and recognizing a change in the light quantity. In addition, a line CCD sensor and an area CCD sensor can be used.

The rotational speed of the image forming unit 1 is not generally changed in a short time (almost a period from forming of the first to fourth detection marks to detection by the detector). Therefore, the aforementioned correction times T21−T21', T31−T31', and T41−T41' are substantially the same value. Therefore, to prevent only image displacements in the sub-scanning direction due to changes in the rotational speed of the image forming unit 1, it is not always necessary to form the aforementioned four detection marks. For example, it is possible to confirm the respective distances between the first to fourth exposure units beforehand, form the first detection mark 20-1 and the second detection mark 20-2, measure only the correction time T21−T21', and control the forming timing of an electrostatic latent image of each image by each exposure unit from the measured result and inter-exposure unit distances.

Next, another embodiment of a detection mark and a detection method for it will be explained.

Figure 3:
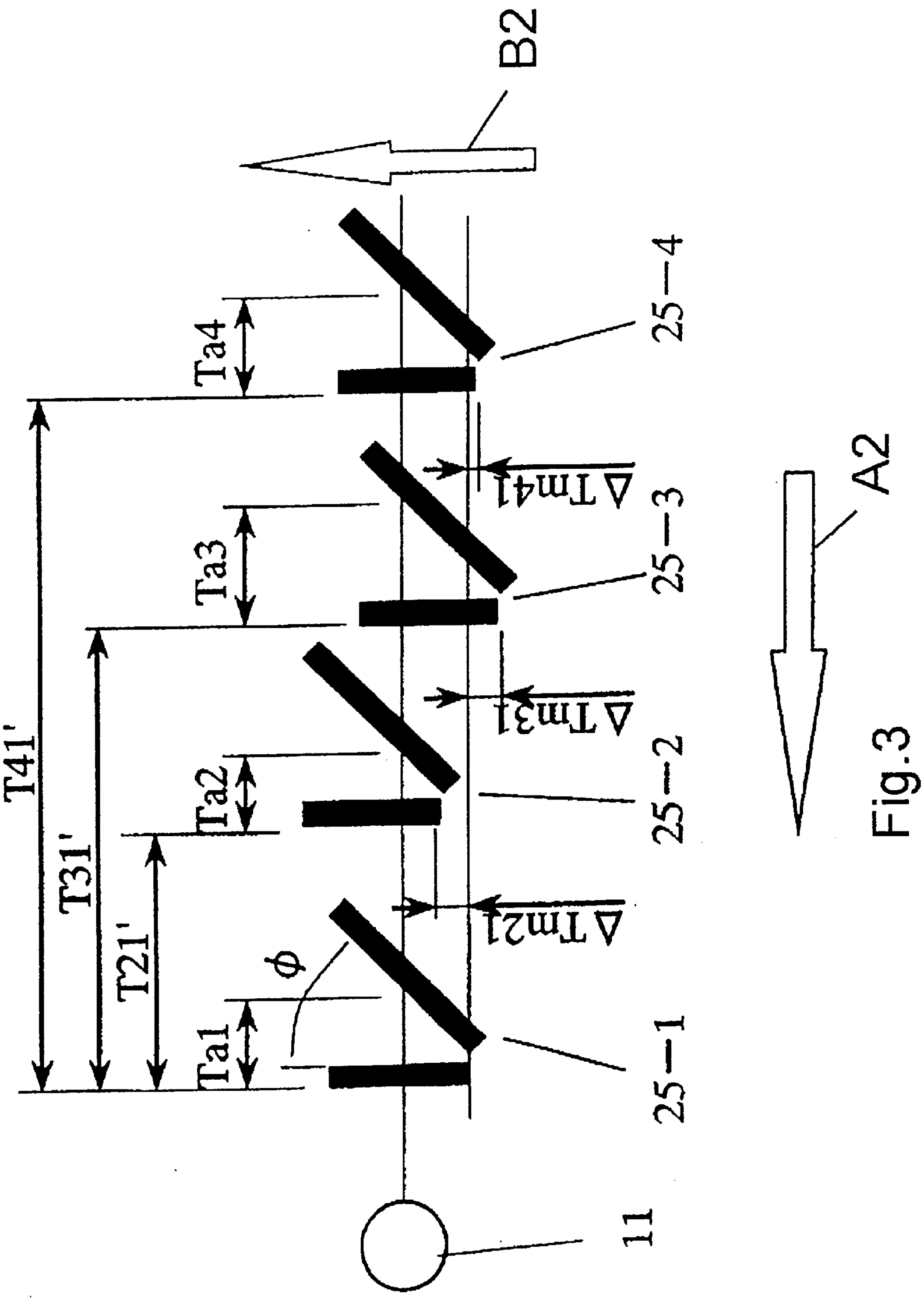
FIG. 3 is a drawing showing a deformation example of a detection mark relating to an embodiment of the present invention and FIG. 4 is a schematic view showing an image gradient detection method in an embodiment of the present invention.

In FIG. 2, the linear detection marks parallel with the main scanning direction B1 are shown. As shown in FIG. 3, the straight lines parallel with the main scanning direction B2 and the oblique lines at a predetermined angle $\phi$ with them are combined respectively, thus the displacements in both the sub-scanning direction A2 and main scanning direction B2 can be corrected.

The detection marks are written on the image forming unit 1 at the time intervals of T+T21, 2×T+T31, and 3"T+T41 in the respective laser exposure units 3-2, 3-3, and 3-4 on the basis of the writing time of the laser exposure unit 3-1. The detector 11 detects the written detection marks 25-1, 25-2, 25-3, and 25-4. The time intervals for detection of the straight lines in the main scanning direction on the basis of the detection mark 25-1 are assumed as Ta1, Ta2, Ta3, and Ta4 respectively.

To eliminate the writing timing deviation in the sub-scanning direction, as mentioned above, it is desirable to form an electrostatic latent image by the second exposure unit the correction time T+(T21−T21') later after start of forming an electrostatic latent image by the first exposure unit, an electrostatic latent image by the third exposure unit after the correction time 2×T+(T31−T31'), and an electrostatic latent image by the fourth exposure unit after the correction time 3×T+(T41−T41').

Next, an example of the displacement correction method in the main scanning direction B2 in the present invention will be explained.

The differences of the detection times Ta2, Ta3, and Ta4 of the lines and oblique lines in the main scanning direction B2 by the respective detection marks 25-2, 25-3, and 25-4 from the detection time difference Ta1 of the lines and oblique lines in the main scanning direction which is measured by the detection mark 25-1 are respectively expressed by the following formulas.

$$Ta21=Ta2-Ta1$$

$$Ta31=Ta3-Ta1$$

$$Ta41=Ta4-Ta1$$

From these time differences, the writing timing variations of the second to fourth exposure units 3-2 to 3-4 in the main scanning direction against the first exposure unit 3-1, assuming the moving speed of the image forming unit in the sub-scanning direction A2 as Vs and the image forming speed in the main scanning direction B2 as Vimg, are respectively expressed by the following formulas.

$$\Delta Tm21=Vs.Ta21/\tan\theta/Vimg$$

$$\Delta Tm31=Vs.Ta31/\tan\theta/Vimg$$

$$\Delta Tm41=Vs.Ta41/\tan\theta/Vimg$$

The writing timing of each laser exposure unit is corrected on the basis of the first exposure unit 3-1 according to these variations, thus the displacements in the main scanning direction can be corrected.

Figure 4:
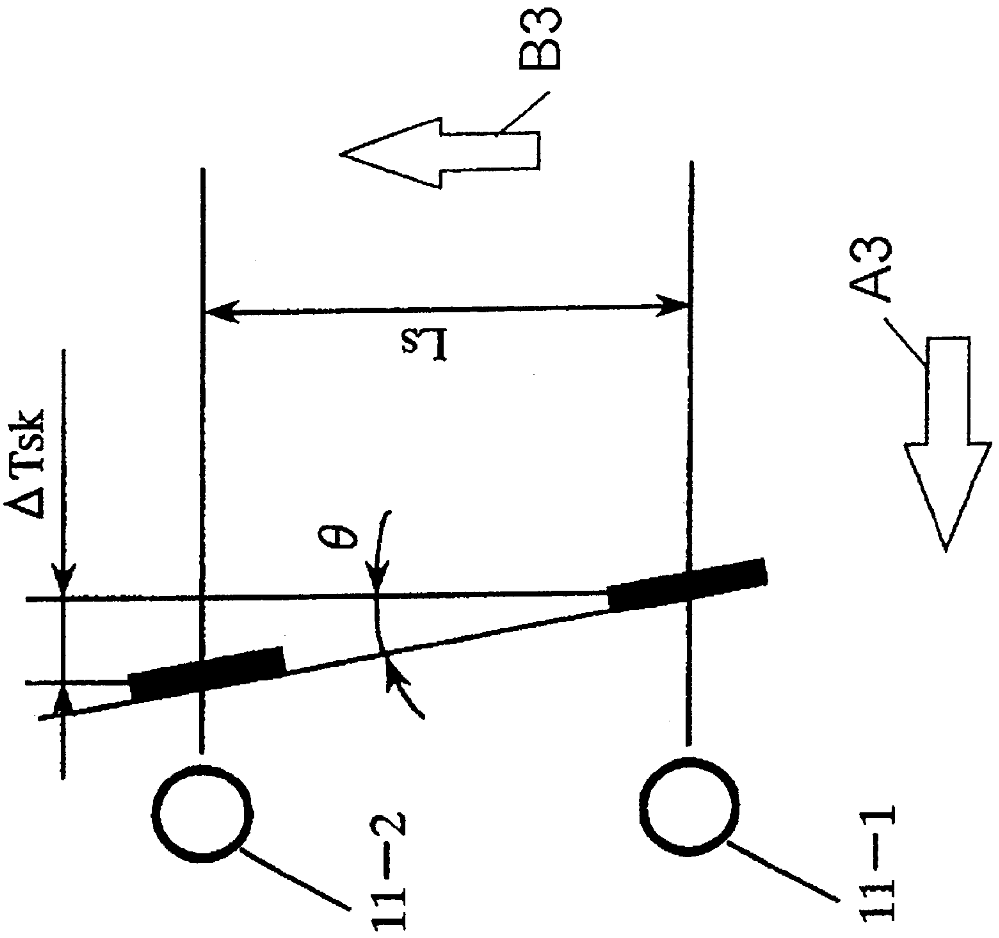

Further, as shown in FIG. 4, the detection marks 20 are respectively formed on both sides of the image area in the main scanning direction B3 in one exposure unit, for example, the first exposure unit 3-1, and the detection units 11 are respectively arranged at the positions where the respective detection marks 20 can be detected, and the time differences of the respective detection signals are obtained, thus the inclination angle of each image with the main scanning direction B3 can be detected. For example, assuming the distance between the detection units 11-1 and 11-2 as Ls, the mark detection time difference by each sensor as Tsk, and the moving speed of the image forming unit 1 in the sub-scanning direction A3 as V, the image inclination angle θ is obtained by the following formula.

$$\theta=\arctan(\Delta TskVS/Ls)$$

Figure 5:
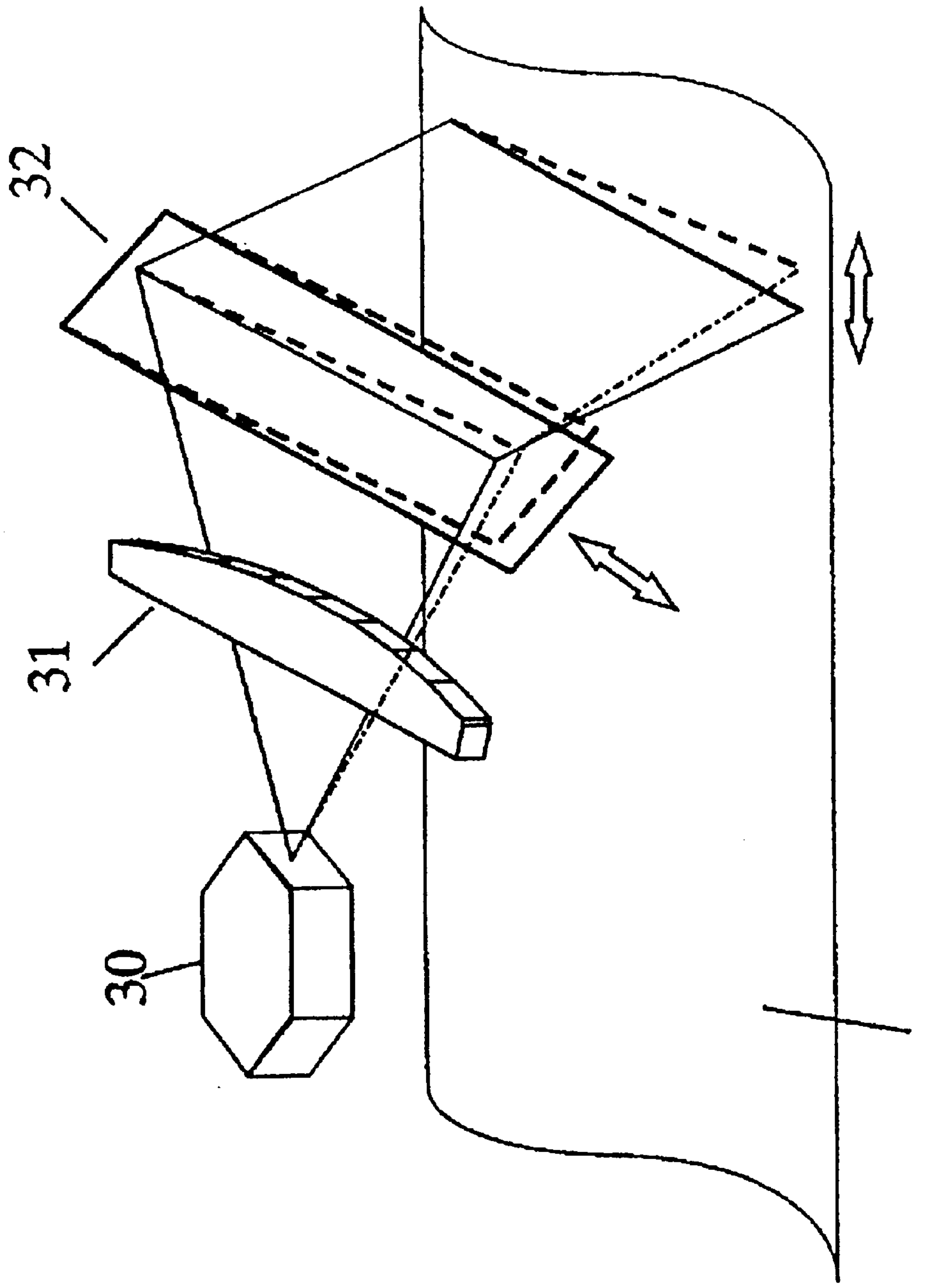
FIG. 5 is a schematic view showing an example of an image displacement correction method in an embodiment of the present invention and FIG. 6 is a drawing showing a contact relation between the transfer unit and the image forming unit in the first embodiment.

On the basis of the detection result, by moving the position of each exposure unit itself by a piezo-electric element or another driving force or as shown in FIG. 5, moving an optical component part inside the exposure device 3, for example, a mirror 32 by a piezo-electric element or another driving force, the image inclination can be corrected. Further, by forming image data which is subjected to a rotation process by the inclination angle θ detected by image processing, the same effect can be obtained.

Further, when light is to be irradiated onto the image forming unit so as to detect the detection marks on the image forming unit 1 by the detection units 11, if the wave length of the light is deviated from the highly photosensitive wave length of the image forming unit 1, the image forming unit can be prevented from deterioration due to the detection units.

Further, as a means for moving the writing positions of the laser exposure units 3 on the base of the detection results of the detection marks 20, by a method for correcting the writing timing in the main scanning direction and sub-scanning direction and additionally moving the respective relative positions of the laser exposure units 3 or driving an optical component part in the laser exposure units 3, for example, the mirror 32 as shown in FIG. 5, thereby moving the writing positions, the same correction effect can be obtained.

Further, as described later in detail, in the first embodiment of the present invention, it is preferable to form a plurality of detection marks on the surface of the image forming unit free of overlapping and it is also preferable to form a plurality of detection marks so that the start positions thereof are put between the transfer position and the detection position.

(3) Transfer Unit

Figure 6:
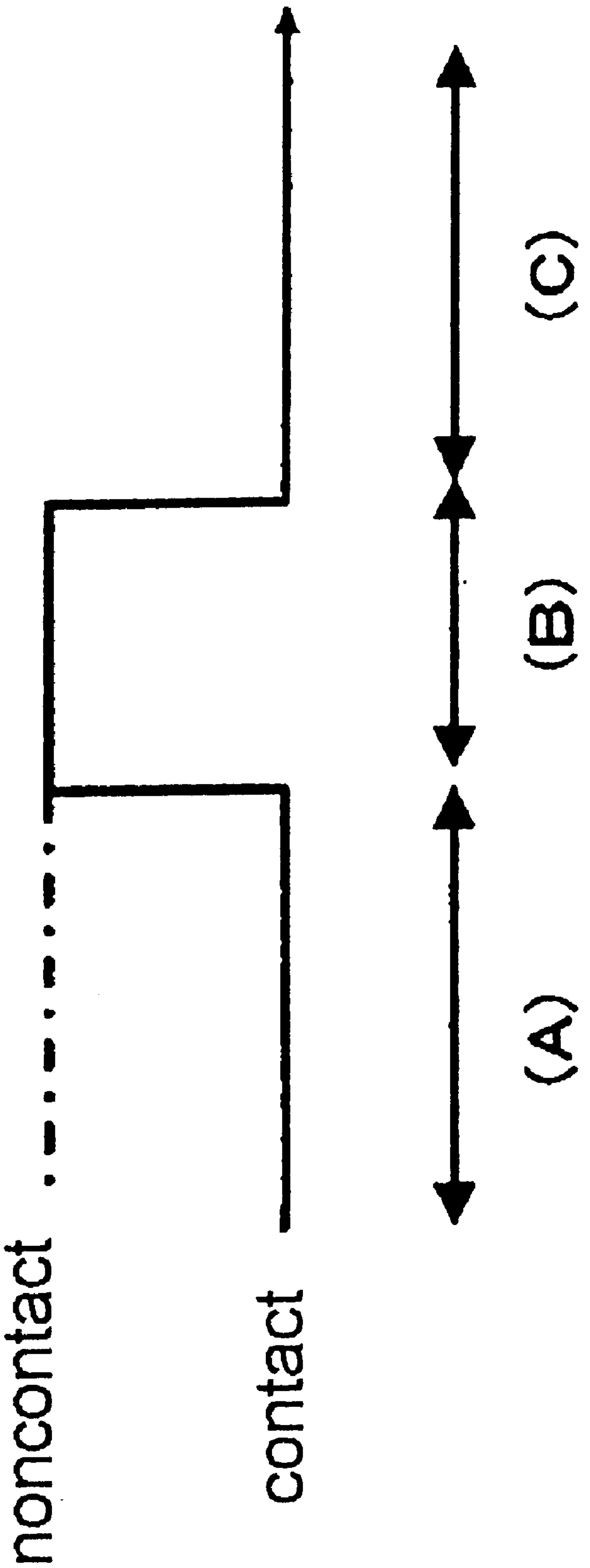

FIG. 6 shows the contact relation between the transfer unit and the image forming unit in the first embodiment of the present invention.

The first embodiment of the present invention is characterized in that during the period (A) from start of forming the detection marks 11 to end of detecting the detection marks 11 by the detection units and during the period (C) of the color image forming process, the intermediate transfer medium 6 is in contact with the image forming unit 1 and during the period (B) of passing of the detection marks 11 through the transfer position, the intermediate transfer medium 6 is in non-contact with the image forming unit 1.

Figure 7C:
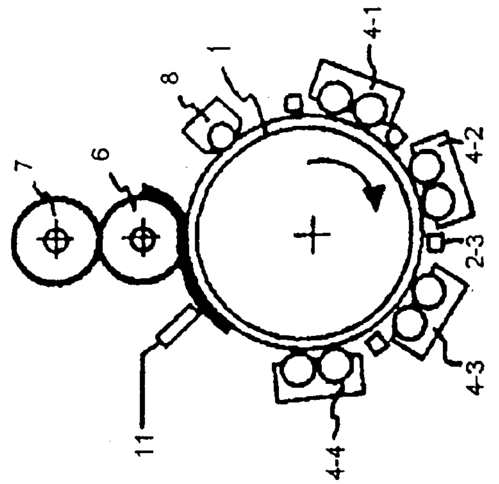
FIG. 7 is a drawing showing the condition of a color image forming apparatus in the state shown in FIG. 6
Figure 7B:
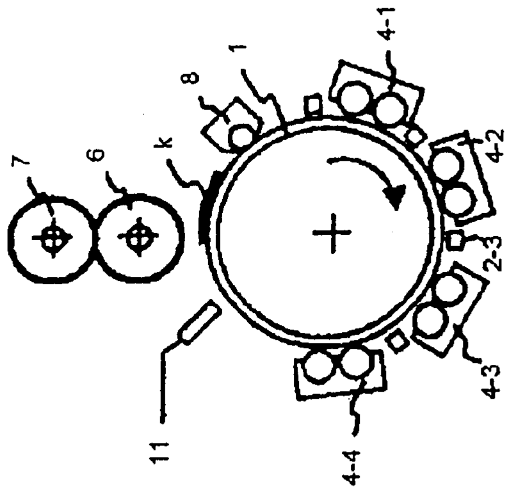
Figure 7A:
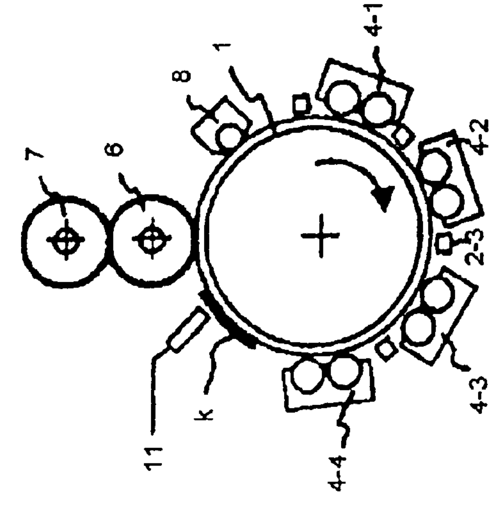

FIGS. 7A, 7B, and 7C show schematic views of the color image forming apparatus under the conditions (A), (B), and (C) shown in FIG. 6 and the behavior of the intermediate transfer medium 6 will be explained more in detail. For the same numerals as those shown in FIG. 1, the explanation will be omitted.

As shown in FIG. 7A, during the period of forming a detection mark and detecting a displacement by the mark detection unit, the intermediate transfer medium 6 is kept in contact with the image forming unit 1.

Next, immediately after completion of displacement detection, the intermediate transfer medium 6 starts a separation operation and before the detection mark reaches the transfer position, as shown in FIG. 7B, the intermediate transfer medium 6 is separated from the image forming unit 1. The detection mark is led to a cleaner 8 without being transferred onto the intermediate transfer medium 6 in this way and the detection mark can be removed from the surface of the image forming unit 1. When an image is being formed actually, the intermediate transfer medium 6 is made contact with the image forming unit 1 as shown in FIG. 7C and a color image c formed on the image forming unit 1 is transferred to the intermediate transfer medium 6.

Meanwhile, the moving time from completion of mark detection to the transfer position is a short time such as 0.2 to 1 second or so. However, since at least an area where a plurality of detection marks are formed is formed in the area between the detection position and the transfer position, the intermediate transfer medium 6 can be kept in contact with the image forming unit 1 before detection of the detection marks and the intermediate transfer medium 6 can be kept in non-contact with the image forming unit 1 before the first detection mark exists at the transfer position. Further, the separation distance between the intermediate transfer medium 6 and the image forming unit 1 may be thicker than the developer layer for forming detection marks and it is set at 0.5 mm in this embodiment, so that the separation operation can be performed with a sufficient spare time.

Furthermore, to output images of fixed size of A4 or A3, during the first to fourth image forming steps, the image forming unit 1 is always kept in contact with the intermediate transfer medium 6.

An experiment for checking the relation between the difference in rotational speed of the image forming unit 1 between a case that the image forming unit 1 is in contact with the intermediate transfer medium 6 and a case that the image forming unit 1 is separated from the intermediate transfer medium 6 and the image displacement caused by the speed difference was executed. The relation will be explained hereunder.

As mentioned above, in the color image forming apparatus of the present invention, the transfer is carried out in a state that the intermediate transfer medium 6 is in contact with the image forming unit 1. The inventors increases the transfer efficiency by setting the press-fit force between the intermediate transfer medium 6 and the image forming unit 1 to a high load of about 50 kg weight (kgf). Further, to prevent image deterioration due to sliding at the transfer position, the intermediate transfer medium 6 and the pressure roller 7 are driven by rotating subordinately to the image forming unit 1. Therefore, in a state that the intermediate transfer medium 6 is in contact, a large load caused by bearing friction of the intermediate transfer medium 6 is applied to the image forming unit 1. The load torque in this experiment is 0.20 to 0.5 kgf.m.

Figure 8:
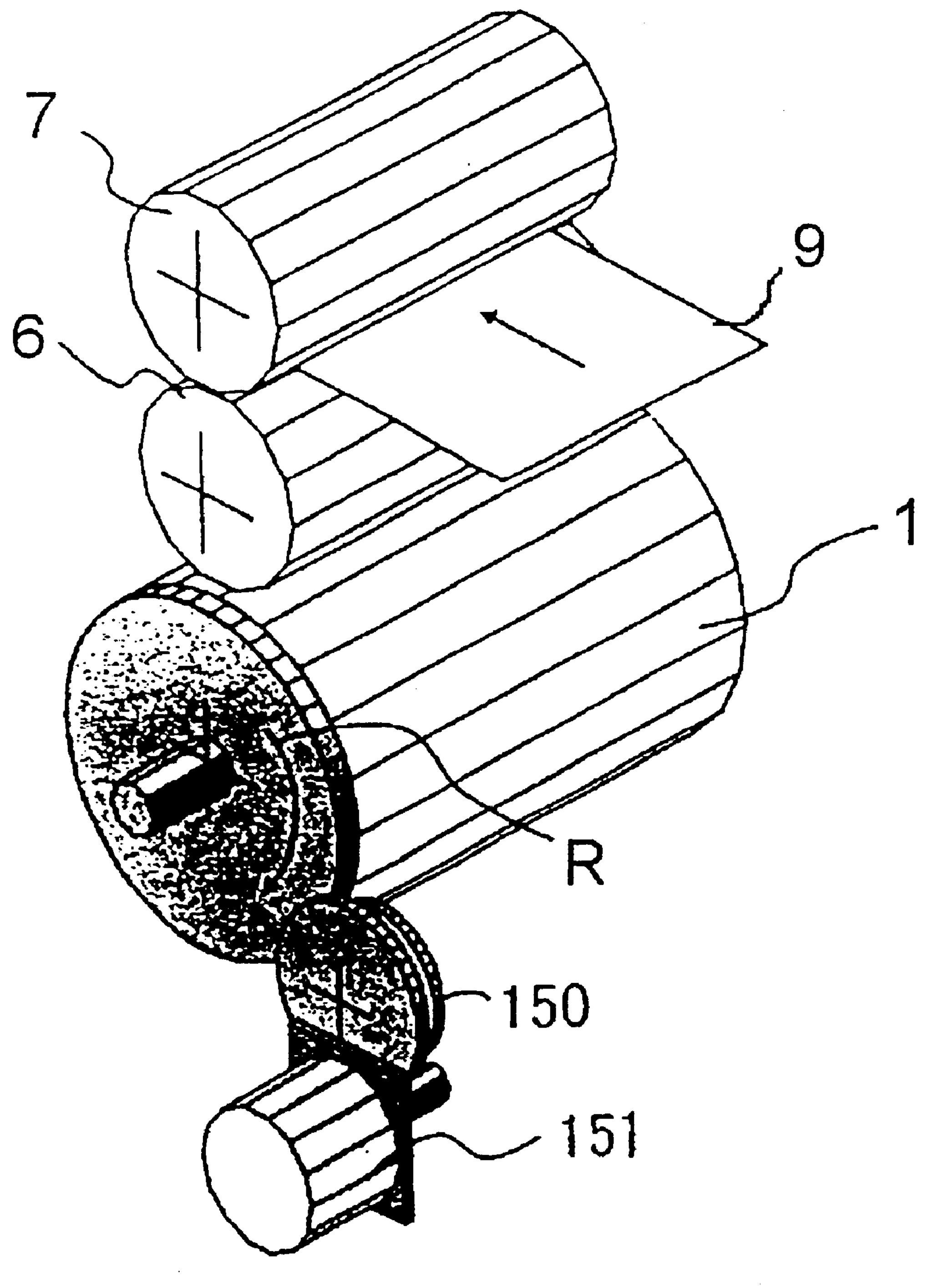
FIG. 8 is a schematic perspective view showing a drive unit relating to an embodiment of the present invention.

On the other hand, the drive means of the image forming unit 1 is composed of, for example, as shown in FIG. 8, a reduction mechanism 150 by a gear and a servo motor 151 driven by a speed control loop. As mentioned above, the control gain of the servo motor is set so as to set the rotation angular speed of the image forming unit 1 in the direction of the arrow R under the load condition to a predetermined value, thus the motor is driven. When the drive conditions including the load condition are fixed, the rotation angular speed of the image forming unit 1 is very stable. However, it is known that when the load condition varies, the rotation angular speed becomes different though slightly. In this experiment, the load when the intermediate transfer medium 6 is in contact is 0.2 to 0.5 kgf.m, while at the time of separation, the load is almost 0 kgf.m. It is ascertained that in the rotation angular speed of the image forming unit 1, a speed difference of about 0.5% is caused by the difference in load condition.

In a comparison experiment, to erase a detection mark for detecting the image displacement by the cleaner 8 without transferring it to the intermediate transfer medium 6, when the intermediate transfer medium 6 is separated beforehand and image formation is executed, a speed difference of 0.5% is generated in the angular speed of the image forming unit 1 compared with a case of contact.

Next, a maximum image displacement caused by the angular speed difference will be calculated.

For example, assuming the diameter D of the image forming unit 1 as 262 mm and the angle ψ between "the exposure point by the first exposure unit" and "the exposure point by the fourth exposure unit" as 135°, when there is a difference of α% in the rotation angular speed of the image forming unit 1, an image displacement of Δx between the first image and the fourth image is expressed as follows:

$$\Delta x=\alpha/100\times D\partial\psi/360$$

Therefore, as mentioned above, when a speed difference of 0.5% is generated in the angular speed of the image forming unit 1, Δx=1.5 mm is obtained.

Therefore, in the comparison experiment aforementioned, when the detection mark forming step and detection step are executed with the intermediate transfer medium 6 separated and the timing of the fourth image forming step is controlled according to the detection step, it is found that an image displacement of about 1.5 mm is generated between the first image and the fourth image.

On the other hand, as indicated in the present invention, when the intermediate transfer medium 6 is kept in non-contact with the image forming unit 1 only during passing of a detection mark through the transfer position and the detection mark forming step and detection step and the first to fourth image forming steps are executed under the same condition (a state that the intermediate transfer medium 6 is in contact with the image forming unit 1), displacement correction can be executed suitably, so that no image displacement is ascertained between the images including the first image to the fourth image.

In a system for detecting displacements of detection marks and correcting the single-image position like this, when the intermediate transfer medium 6 is separated beforehand so as to erase detection marks, a superimposition displacement different from that at the time of forming a real image is detected and moreover, the image position is corrected on the basis of the detection variation, so that the image displacement correction is not functioned effectively at the time of forming a real image.

Further, it is known that the allowable displacement that an image displacement is not questionable visually and a good image quality is obtained is about 0.08 mm. However, the calculation result from the aforementioned comparison experiment is extremely higher than the allowable value and it is clearly a big problem for obtaining a high quality image.

For the above reason, in the present invention, the intermediate transfer medium 6 is kept in contact not only during forming detection marks but also until completion of detection by the mark sensor and the load condition applied to the image forming unit 1 is made equal to that for real image formation, thus no difference is generated in the rotation angular speed.

By doing this, the image superimposition displacement at the time of forming detection marks is the same as that at the time of forming real images and the system for correcting the image position on the basis of the detection mark displacement functions effectively.

Figure 9:
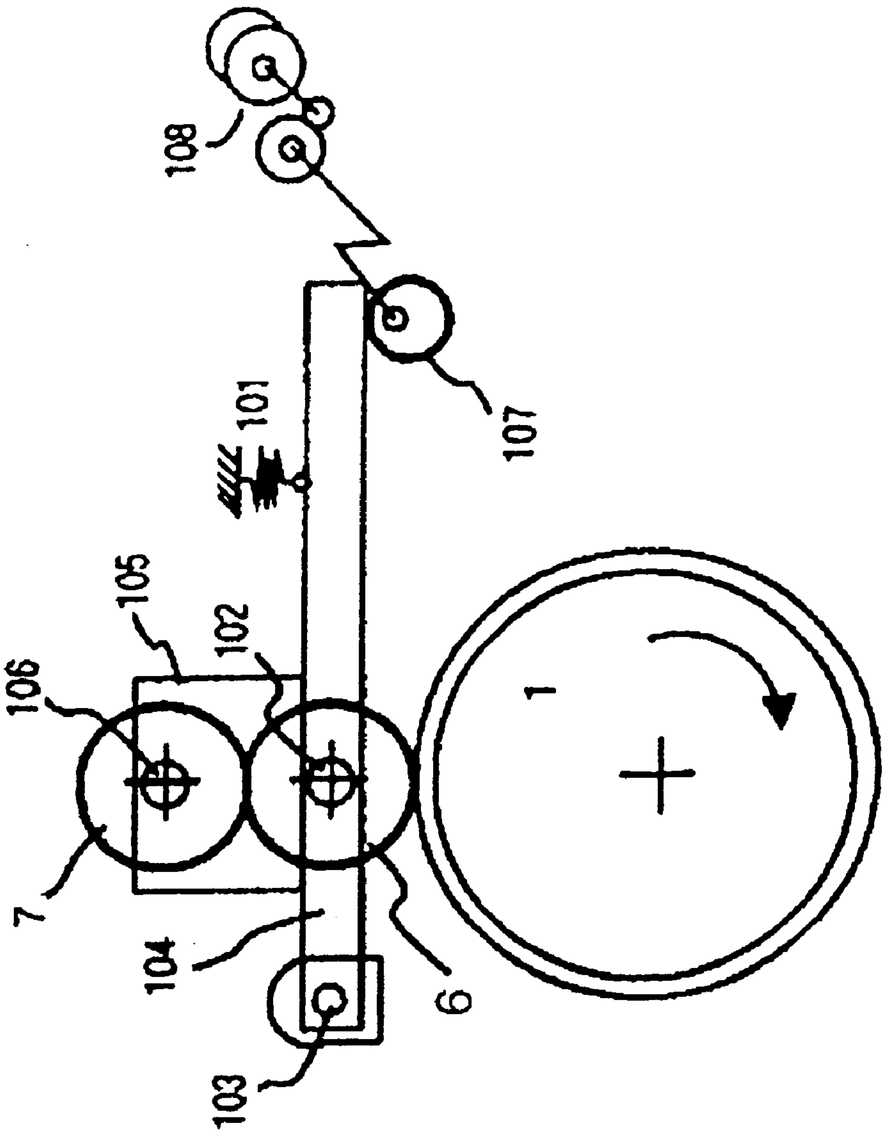
FIG. 9 is a schematic view showing a transfer medium contact and separation mechanism relating to an embodiment of the present invention and FIG. 10 is a schematic view of a color image forming apparatus relating to the second embodiment.

Next, with respect to a mechanism for switching the transfer device including the intermediate transfer medium 6 and the image forming unit 1 to contact or non-contact, a concrete example is shown in FIG. 9.

The intermediate transfer medium 6 is held by a lever 104 that a bearing 102 thereof can rotate round a rotation axis 103 and can make contact with or separate from the image forming unit 1. For transfer by pressure, a spring 101 is selected so as to apply desired pressure force (for example, about 50 kgf) to the image forming unit 1 from the intermediate transfer medium 6. A pressure roller bearing 106 is held by a housing 105 fixed to the lever 104 and the pressure roller 7 is interlocked with the intermediate transfer medium 6.

The contact and separation operation is controlled by an eccentric cam 107 installed at the end of the lever 104 and a motor with a speed reducer. The eccentric cam 107 is rotated by rotation of the motor, and the lever 104 is pushed up, and the separation operation is executed. The intermediate transfer medium 6 and the pressure roller 7 have no drive source so as to prevent image deterioration due to relative sliding at the transfer position and are driven by the contact force from the image forming unit 1.

In this way, by rotation control of the motor, the separation operation between the intermediate transfer medium 6 and the image forming unit 1 can be controlled.

Further, as mentioned above, the reason that the intermediate transfer medium 6 and the image forming unit 1 are kept in non-contact with each other at the time of passing of the detection marks through the transfer position is that the detection marks are removed from the image forming unit 1 by the cleaner at the later stage of the intermediate transfer medium 6. By doing this, there is no need to transfer the detection marks onto the final transfer medium 9 such as a recording form and unnecessary consumption of recording forms is eliminated. Further, when toner particles constituting the first to fourth images are not transferred from the image forming unit to the intermediate transfer medium 6, the cleaner 8 can be used also as a cleaner for removing so-called untransferred toner.

Next, the second embodiment of the present invention will be explained.

Figure 10:
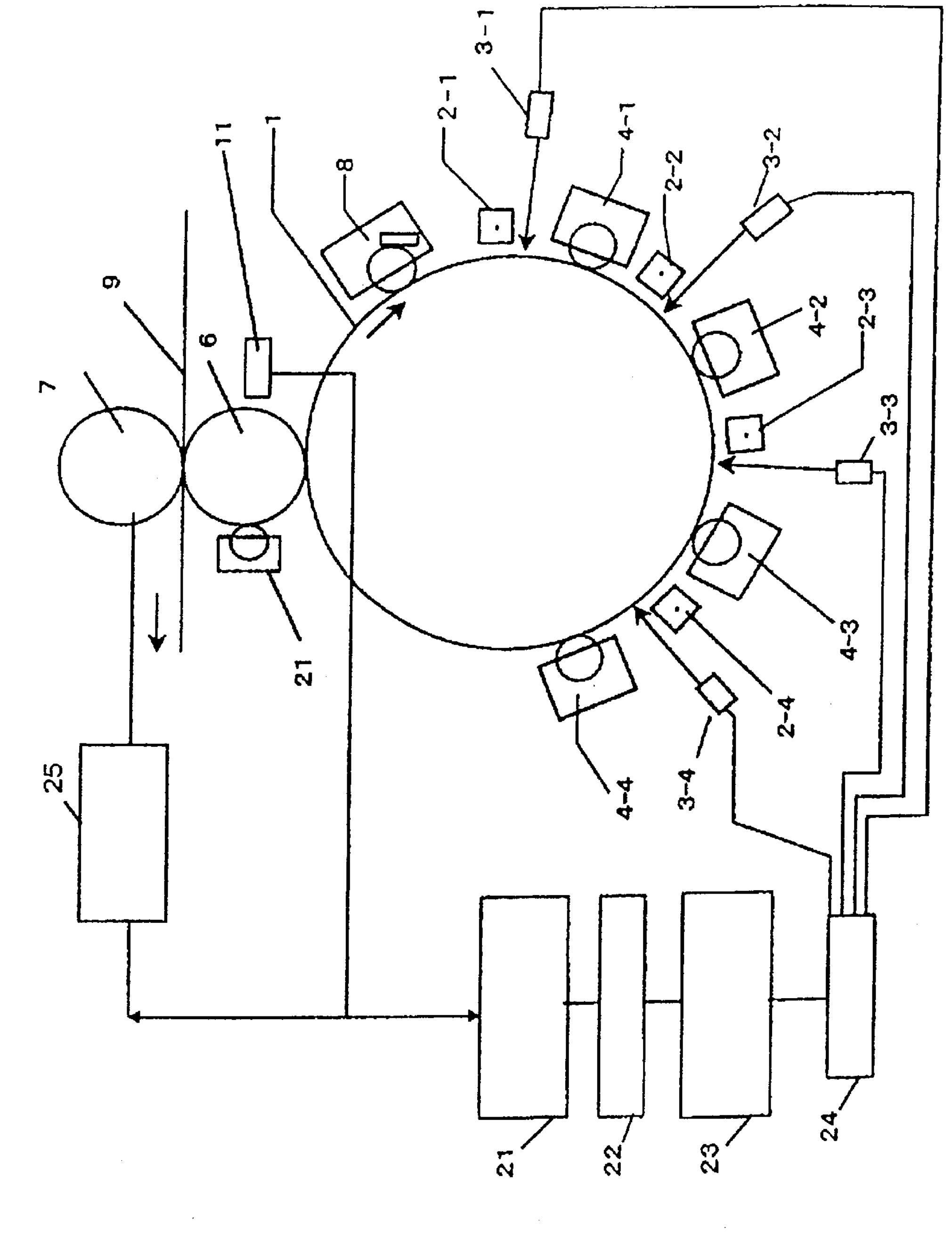

FIG. 10 shows a color image forming apparatus for explaining the second embodiment of the present invention.

In the color image forming apparatus shown in FIG. 10, the intermediate transfer medium 6 is always in contact with the image forming unit 1 and the pressure body 7 and the intermediate transfer medium 6 can be switched to contact or non-contact.

The first to fourth image forming steps and color images on the surface of the image forming unit 1 obtained by the steps are formed in the same way as with those explained in the first embodiment.

Further, the first to fourth detection mark forming steps are also executed in the same way as with the first embodiment.

In the second embodiment, a point that detection marks formed on the image forming unit 1 are transferred from the image forming unit 1 to the intermediate transfer medium 6 and further, a point that the relative position of detection marks is detected by the detection unit arranged in the neighborhood of the intermediate transfer medium 6 are different.

Furthermore, a point that only when detection marks pass the transfer position from the intermediate transfer medium 6 to the final transfer medium 9, the pressure body 7 is driven so as to make non-contact with the intermediate transfer medium is different.

Namely, in the second embodiment of the present invention, during the period from the first to fourth image forming steps to transfer of color images to the final transfer medium and during the period from the first to fourth detection mark forming steps to end of the detection step, the image forming unit 1 is in contact with the intermediate transfer medium 6 and the intermediate transfer medium 6 is in contact with the pressure body 7. Therefore, in the same way as with the first embodiment, detection of detection marks and forming of color images are executed under the same condition, so that image displacements are corrected on the basis of the detection results of detection marks, thus image displacements can be prevented surely.

Further, when detection marks transferred to the surface of the intermediate transfer medium 6 pass the transfer position to the final transfer medium 9, no final transfer medium is fed, so that no waste of final transfer media such as recording forms is generated. Further, the pressure body 7 is not in contact with the intermediate transfer medium 6, so that contamination of the pressure body 7 by detection marks can be prevented.

The detection marks passing the transfer position to the final transfer medium are removed by a cleaner 21 arranged on the downstream side of the transfer position. In this case, the first to fourth detection marks must be recorded in the area to be placed between the detection position and the transfer position to the final transfer medium.

The first embodiment mentioned above requires an area where the first to fourth detection marks can be between the transfer position from the image forming unit 1 to the intermediate transfer medium 6 and the detection position, so that various problems such that the interval between the image recording units is narrowed are imposed on equipment design. According to the second embodiment of the present invention, the interval between the fourth image recording unit and the transfer position can be narrowed or a desired device may be arranged between the image recording unit and the transfer position.

As explained above, according to the present invention, a color image that an image of the first color and an image of the second color are positioned precisely and an image displacement is suppressed can be formed.

What is claimed is:

1. A color image forming apparatus comprising:

a rotating image forming unit having a surface;

a first image forming device arranged around the image forming unit for forming a first detection mark and a first image;

a second image forming device for forming a second detection mark and a second image over the first image on the surface of the image forming unit;

a transfer mechanism for transferring the first image and the second image from the image forming unit;

a controller for controlling the first and second image forming devices; and a detector for detecting the first detection mark formed by the first image forming device and the second detection mark formed by the second image forming device, wherein the controller corrects a forming position of the first image by the first image forming device or a forming position of the second image by the second image forming device according to a relative position of the first and second detection marks detected by the detector, and the color image forming apparatus further has transfer mechanism separation means for keeping the transfer mechanism separated from the image forming unit at least during passing of the first and second detection marks through the transfer mechanism.

2. A color image forming apparatus according to claim 1, wherein the detector is installed between the transfer mechanism and the second image forming device.

3. A color image forming apparatus according to claim 1, wherein the first detection mark and the second detection mark are formed respectively at a predetermined interval on the surface of the image forming unit in a parallel direction to a rotational direction of the image forming unit and according to a time corresponding to a difference when the interval is different from the predetermined interval, the controller corrects the forming positions of the first image and the second image.

4. A color image forming apparatus according to claim 1, wherein the first detection mark and the second detection mark are respectively composed of a parallel detection mark installed in a parallel direction to a rotational direction of the image forming unit and an angle detection mark provided in a direction at a fixed angle with the parallel detection mark, and the detector detects image displacements in the rotational direction of the image forming unit and in a perpendicular direction to the rotational direction.

5. A color image forming apparatus according to claim 1, further comprising:

a third image forming device for forming a third detection mark on the image forming surface; and a fourth image forming device for forming a fourth detection mark on the image forming surface, wherein the transfer mechanism separation means separates the transfer mechanism from the image forming unit even during passing of the third detection mark and fourth detection mark formed on the image forming unit by the image forming devices though the transfer mechanism.

6. A color image forming method comprising:

a first image forming step of forming a first image on a surface of a rotating image forming unit by a first image forming device;

a second image forming step of forming a second image on the surface of the rotating image forming unit on which the first image is formed by a second image forming device;

a step of transferring the first image and the second image formed on the surface of the image forming unit to a transfer mechanism arranged in contact with the image forming unit in a batch;

a detection step of forming a first detection mark on the surface of the image forming unit by the first image forming device in a state that the transfer mechanism is in contact with the image forming unit, forming a second detection mark on the image forming unit on which the first detection mark is formed by the second image forming device, and detecting a relative position of the first detection mark and the second detection mark by a detector arranged at a detection position; and a separation step of keeping the transfer mechanism in non-contact with the image forming unit when the first detection mark and the second detection mark pass a transfer position, wherein the first image forming step is performed in a state that the transfer mechanisms is in contact with the image forming unit, and the second image forming step is performed by controlling timing according to a detection result obtained at the detection step in a state that the transfer mechanism is in contact with the image forming unit.

7. A color image forming method according to claim 6, wherein an interval between the first detection mark and the second detection mark is narrower than an interval between the detection position and the transfer position.

8. A color image forming method according to claim 6, wherein the first detection mark and the second detection mark are two or more line segments not parallel with each other.

9. A color image forming method according to claim 6, wherein the first detection mark and the second detection mark are formed respectively at a predetermined interval on the surface of the image forming unit in a parallel direction to a rotational direction of the image forming unit and according to a time corresponding to a difference when the interval is different from the predetermined interval, the first detection mark and the second detection mark execute the timing control.

10. A color image forming method according to claim 6, wherein the first detection mark and the second detection mark are respectively composed of a parallel detection mark installed in a parallel direction to a rotational direction of the image forming unit and an angle detection mark provided in a direction at a fixed angle with the parallel detection mark, and the detection step detects image displacements in the rotational direction of the image forming unit and in a perpendicular direction to the rotational direction.

11. A color image forming method comprising:

a first image forming step of forming a first image on a surface of a rotating image forming unit by a first image forming device;

a second image forming step of forming a second image on the surface of the rotating image forming unit on which the first image is formed by a second image forming device;

a first transfer step of transferring the first image and the second image formed on the surface of the image forming unit to a first transfer medium arranged in contact with the image forming unit at a first transfer position in a batch;

a second transfer step of feeding a second transfer medium between the first transfer medium and a pressure body arranged in contact with the first transfer medium at a second contact position and transferring the first image and the second image transferred onto the first transfer medium in a batch onto the second transfer medium in a batch;

a detection step of forming a first detection mark on the surface of the image forming unit by the first image forming device in a state that the second transfer medium is in contact with the pressure body, forming a second detection mark by the second image forming device on the image forming unit on which the first detection mark is formed, transferring the first detection mark and the second detection mark onto the first transfer medium in a batch, and detecting a relative position of the first detection mark and the second detection mark on the first transfer medium by a detector arranged at a detection position; and a separation step of keeping the second transfer medium in non-contact with the first transfer medium when the first detection mark and the second detection mark pass the second transfer position, wherein the first image forming step is performed in a state that the second transfer medium is in contact with the first transfer medium, and the second image forming step is performed by controlling timing according to a detection result obtained at the detection step in a state that the second transfer medium is in contact with the first transfer medium.

12. A color image forming method according to claim 11, wherein the first detection mark and the second detection mark are formed respectively at a predetermined interval on the surface of the image forming unit in a parallel direction to a rotational direction of the image forming unit and according to a time corresponding to a difference when the interval is different from the predetermined interval, the first detection mark and the second detection mark execute the timing control.

13. A color image forming method according to claim 11, wherein the first detection mark and the second detection mark are respectively composed of a parallel detection mark installed in a parallel direction to a rotational direction of the image forming unit and an angle detection mark provided in a direction at a fixed angle with the parallel detection mark, and the detection step detects image displacements in the rotational direction of the image forming unit and in a perpendicular direction to the rotational direction.

14. A color image forming method comprising:

a first image forming step of charging a surface of an image forming unit by a first charger, selectively exposing the charged surface of the image forming unit by a first exposure unit, thereby forming an electrostatic latent image of a first image on the surface of the image forming unit, developing the electrostatic latent image of the first image by a first developing unit for feeding a developer to the electrostatic latent image of the first image, and forming the first image;

a second image forming step of charging the surface of the image forming unit on which the first image is formed by a second charger, selectively exposing the charged surface of the image forming unit by a second exposure unit, thereby forming an electrostatic latent image of a second image on the surface of the image forming unit, developing the electrostatic latent image of the second image by a second developing unit for feeding a developer to the electrostatic latent image of the second image, and forming the second image;

a step of transferring the first image and the second image formed on the surface of the image forming unit to an intermediate transfer roller arranged in contact with the image forming unit at a transfer portion in a batch;

a first detection mark forming step of charging the surface of the image forming unit, selectively exposing the charged surface of the image forming unit by the first exposure unit in a state that the intermediate transfer roller is in contact with the image forming unit, thereby forming an electrostatic latent image of a first detection mark, developing the electrostatic latent image of the first detection mark by the first developing unit, and forming a visible image of the first detection mark;

a second detection mark forming step selectively exposing the surface of the image forming unit on which the first detection mark is formed by the second exposure unit after a predetermined time from forming the electrostatic latent image of the first detection mark, thereby forming an electrostatic latent image of a second detection mark, developing the electrostatic latent image of the second detection mark by the second developing unit, and forming a visible image of the second detection mark;

a detection step of detecting a time difference between the first detection mark and the second detection mark passing a detection position by a detector arranged at the detection position;

a separation step of keeping the intermediate transfer roller and the image forming unit in non-contact with each other when the first detection mark and the second detection mark pass a transfer position, wherein the first image forming step is processed in a state that the intermediate transfer roller is in contact with the image forming unit after the detection step, and the first image forming step of calculating a time until an exposure area exposed by the first exposure unit is exposed by the second exposure unit from the predetermined time and the detected time difference and being performed after the calculated time from start of the first image forming in a state that the intermediate transfer roller is in contact with the image forming unit.

15. A color image forming method according to claim 14, wherein the first detection mark and the second detection mark are respectively composed of a parallel detection mark installed in a parallel direction to a rotational direction of the image forming unit and an angle detection mark provided in a direction at a fixed angle with the parallel detection mark, and the detection step detects image displacements in the rotational direction of the image forming unit and in a perpendicular direction to the rotational direction.

* * * * *